US006484106B1

(12) United States Patent
Schoch

(10) Patent No.: US 6,484,106 B1
(45) Date of Patent: Nov. 19, 2002

(54) MECHANICAL DEVICE PRODUCTIVITY IMPROVEMENT WITH USAGE ANALYSIS, MANAGEMENT, AND IMPLEMENTATION METHODOLOGY FOR MANUFACTURING FACILITY

(75) Inventor: Daniel A. Schoch, Minster, OH (US)

(73) Assignee: The Minster Machine Company, Minster, OH (US)

(*) Notice: Subject to any disclaimer, the term of this patent is extended or adjusted under 35 U.S.C. 154(b) by 95 days.

(21) Appl. No.: 09/626,513

(22) Filed: Jul. 27, 2000

Related U.S. Application Data

(60) Provisional application No. 60/146,535, filed on Jul. 30, 1999.

(51) Int. Cl.[7] ................................................ G06F 19/00

(52) U.S. Cl. ............................................ 702/34; 702/33

(58) Field of Search ................................ 700/206, 174; 73/778, 570, 862.53, 770, 862.54; 72/15.1, 3; 708/56, 182; 318/565; 702/34

(56) References Cited

U.S. PATENT DOCUMENTS

| | | | | |
|---|---|---|---|---|
| 3,872,285 A | | 3/1975 | Shum et al. | |
| 4,048,848 A | | 9/1977 | Dybel | |
| 4,116,050 A | | 9/1978 | Tanahashi et al. | |
| 4,453,421 A | | 6/1984 | Umano | |
| 4,633,720 A | | 1/1987 | Dybel et al. | |
| 5,094,107 A | | 3/1992 | Schoch | |
| 5,423,199 A | | 6/1995 | Mangrulkar | |
| 5,586,041 A | | 12/1996 | Mangrulkar | |
| 5,701,811 A | | 12/1997 | Kawakami | |
| 5,852,793 A | | 12/1998 | Board et al. | |
| 5,854,994 A | | 12/1998 | Canada et al. | |
| 5,875,420 A | | 2/1999 | Piety et al. | |
| 6,047,579 A | * | 4/2000 | Schmitz | 72/15.1 |
| 6,122,565 A | * | 9/2000 | Wenning et al. | 700/206 |
| 6,209,400 B1 | * | 4/2001 | Schoch et al. | 73/778 |

* cited by examiner

*Primary Examiner*—John S. Hilten
*Assistant Examiner*—Xiuquin Sun
(74) *Attorney, Agent, or Firm*—Randall J. Knuth

(57) ABSTRACT

The invention comprises a method of monitoring, analyzing and managing mechanical press usage. The method of this form of the current invention includes the steps of: monitoring vibration severity, including vibration severity zone; monitoring tipping moment severity; monitoring press repair information, including die repair information; monitoring press maintenance information, including die maintenance information; monitoring press applied load; and analyzing the effect of vibration severity, tipping moment severity, press repair, press maintenance and applied load to determine necessary press modifications.

12 Claims, 7 Drawing Sheets

MECHANICAL DEVICE PRODUCTIVITY IMPROVEMENT WITH USAGE ANALYSIS, MANAGEMENT, AND IMPLEMENTATION METHODOLOGY FOR MANUFACTURING FACILITY

CROSS-REFERENCE TO RELATED APPLICATIONS

This application relates to and claims the benefit under 35 U.S.C. §119 of Provisional Application Serial No. 60/146,535 filed Jul. 30, 1999 by the same inventor.

BACKGROUND OF THE INVENTION

1. Field of the Invention

The present invention relates to mechanical presses and, more particularly to a method and apparatus for determining optimal press usage and for making repair and/or replacement recommendations as well as continued usage recommendations based upon the analysis performed for a manufacturing facility. Press usage analysis includes analysis of die load, tipping moment, vibration severity, die chipping and/or press die repair or maintenance information. The usage recommendations will lead to greater productivity within a plant site, as well as, press and machine longevity.

2. Description of the Related Art

Conventional press machines employ a tooling apparatus in the form of a die assembly to shape a workpiece, such as in a stamping or drawing operation. The die assembly particularly includes a lower die attached to a non-moveable bed or bolster and an upper die or punch attached to a reciprocating slide. The upper and lower dies, which are installed in opposing spaced apart relation to one another, cooperate during press machine operation to mutually engage the workpiece at respective sides thereof to thereby effect the desired forming activity.

Repeated stamping operations of a mechanical press cause die wear. The ability to accurately predict die wear or to predict operating conditions which indicate the propensity for increased die wear is advantageous in that press down time for die replacement or reconditioning can be predicted or even potentially diverted by proactive early corrective intervention. The ability to predict die wear allows the operator of a mechanical press to better plan times for die replacement or to intervene with corrective actions, so that productivity loss is not experienced. Further, the ability to predict die wear is advantageous in that press down time associated with die maintenance can be minimized. To accurately predict die wear, tipping moment severity must be accounted for. Since die wear is useful in increasing productivity, tipping moment severity forms a part of the analysis system of the present invention.

A press applies force to a workpiece so that the workpiece (i.e. stock material) acquires the desired formation corresponding to the die set being utilized. Systems for monitoring press operating reliability assist the press owner in evaluating the impact of certain die/load applications on the reliability of the press being monitored. Monitoring systems include systems which utilize contact load sensors to monitor the peak load being developed within certain components of the press machine during a slide stroke of the press. Known methods of monitoring peak loads utilize a strain gage or other transducer which is mounted on the press and which directly measures a value of applied load. Monitoring load exerted on load bearing members during a slide stroke of a mechanical press allows press and die applications to be adjusted when monitored peak load values are outside an acceptable range. Load values not only provide valuable press adjustment information, but also provide valuable use severity information.

Most mechanical systems, including mechanical presses, have a certain operational lifetime based upon their material of construction, their structure, and the level of use which they experience. Use experienced by a mechanical device can be measured by many indicators, such as time of use and severity of use. Many factors may contribute to the severity of use of a mechanical device. The severity of use of a mechanical press can be measured in many ways including, for example, vibration severity experienced during press operation, tipping moment severity experienced during press operation, applied load, dynamic parallelism, and whether the press has been run with a chipped die in place.

What is needed in the art is an implementation methodology to monitor and evaluate mechanical presses in use which combines all of the above-mentioned indicators of use severity.

What is further needed in the art is a method and apparatus which can be utilized to measure the use severity of mechanical presses in operation and which will be effective in establishing which presses could experience increased use severity and which presses should be run at a decreased level of use severity.

Further, this methodology will also identify which presses and applications can be operated at greater productivity with optimized operating conditions.

SUMMARY OF THE INVENTION

The present invention is directed to improve upon the ability to accurately monitor and evaluate mechanical presses used within facilities and to provide a systematic method for solving a multitude of mechanical press problems at once.

The invention, in one form thereof, comprises a method of monitoring, analyzing and managing mechanical press usage. The method of this form of the current invention includes the steps of: monitoring vibration severity, including vibration severity zone; monitoring tipping moment severity; monitoring press repair information, including die repair information; monitoring press maintenance information, including die maintenance information; monitoring press applied load; and analyzing the effect of vibration severity, tipping moment severity, press repair, press maintenance and applied load to determine necessary press modifications.

In one form of the current invention, tipping moment severity is monitored by attaching a load sensor to the bed of a running press or connecting sensors to the slide connections, uprights, or dies. A computational device is communicatively connected to the sensor and is operative to compute and measure tipping moment severity of the running press based upon the sensed load value and methods for computing moments. Other sensors may measure load versus time, or right versus left type forces. The computational device can be, for example, a microprocessor.

The invention, in another form thereof, includes a means for measuring die life risk condition based upon tipping moment severity. Die life risk condition provides another useful measure of pressure severity. One or more load sensors are attached to the bed, connections or other locations of a running press and a computational device which stores a unique tipping moment severity chart for the running press, a plurality of tipping moment severity factors which correspond to zones of tipping moment severity on the tipping moment severity chart and a plurality of zone of criticality factors which correspond to the zones of criticality on the tipping moment severity chart is provided. The computational device receives the load values sensed from the load sensors and uses means to compute tipping moments based upon the sensed load values. The computational device also utilizes the tipping moment severity chart, the tipping moment severity factors, the zone of criticality factors, and the measured tipping moment to compute a measure of die life risk condition. Load may also be computed based upon theoretical load analysis as described below.

An advantage of the present invention is the ability to lessen the tipping moment of the die so as to decrease die chipping, die repair and die maintenance.

Another advantage of the present invention is the ability to increase production by decreasing the use severity of particular applications, or increasing the maximum severity capability of the press which is then better able to handle such an increased use severity. Press Applications may be transferred to an alternate press better suited for utilization of that particular press application.

A further advantage of the present invention is the ability to effectively increase mechanical press production while keeping the impact of press use severity to a minimum.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2:
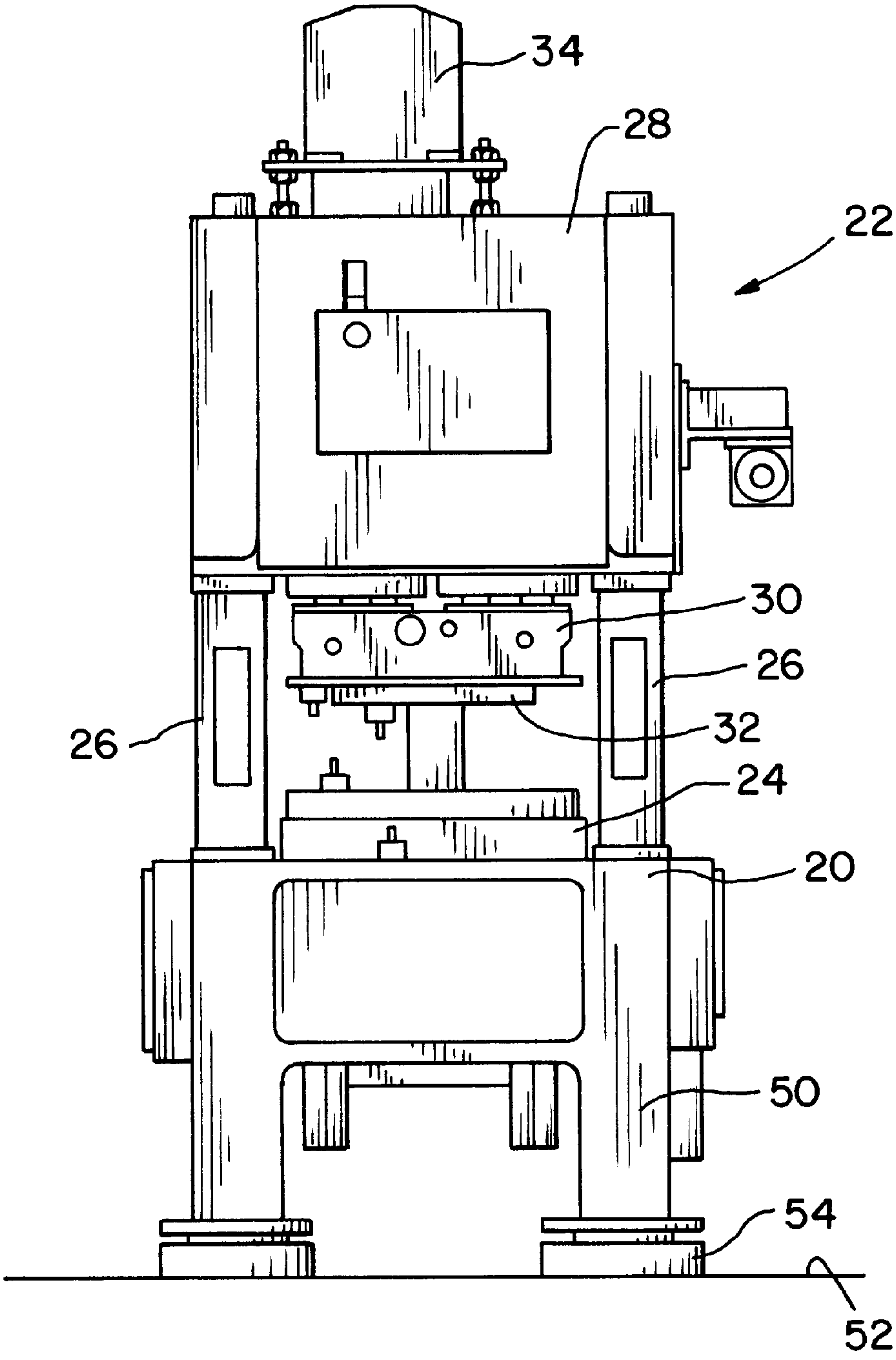
FIG. 2 is an elevational view of a typical press which is the subject of tipping moment monitoring.
Figure 3A:
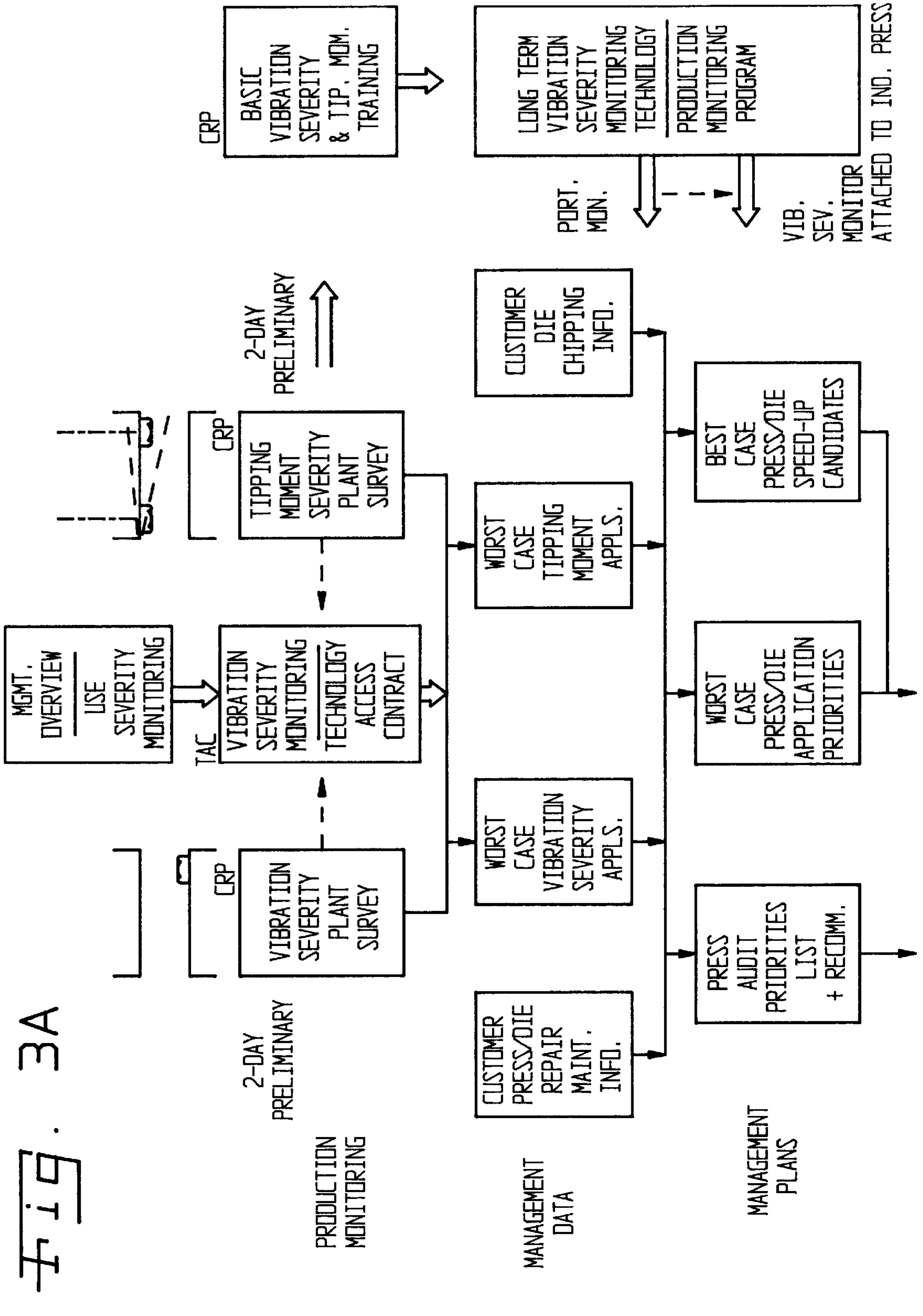
FIGS. 3*a* and 3*b* is a flow chart of one form of the mechanical press usage analysis and management system of the current invention.
Figure 3B:
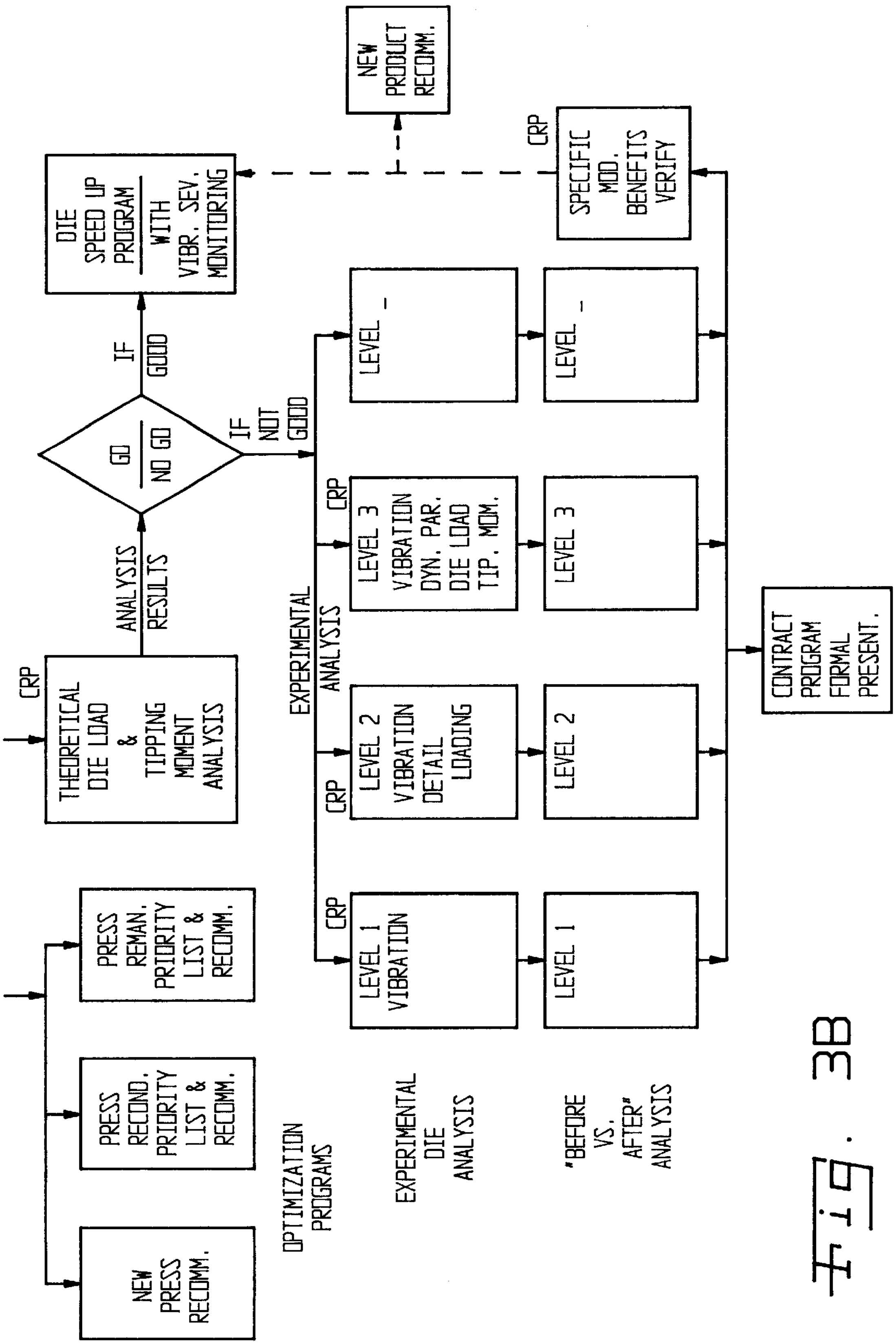
Figure 4A:
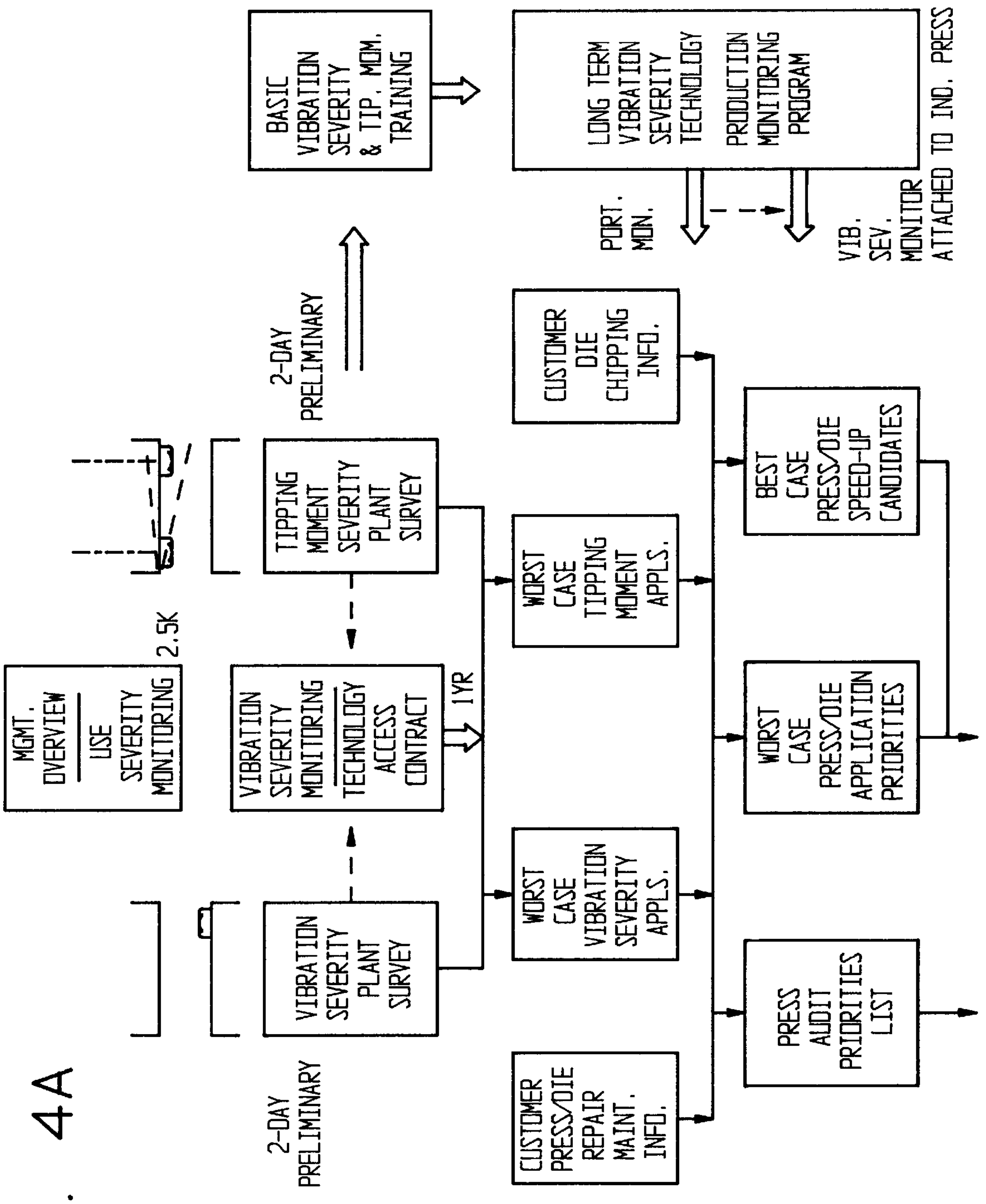
FIGS. 4*a* and 4*b* is a flow chart of another form of the mechanical press usage analysis and management system of the current invention.
Figure 4B:
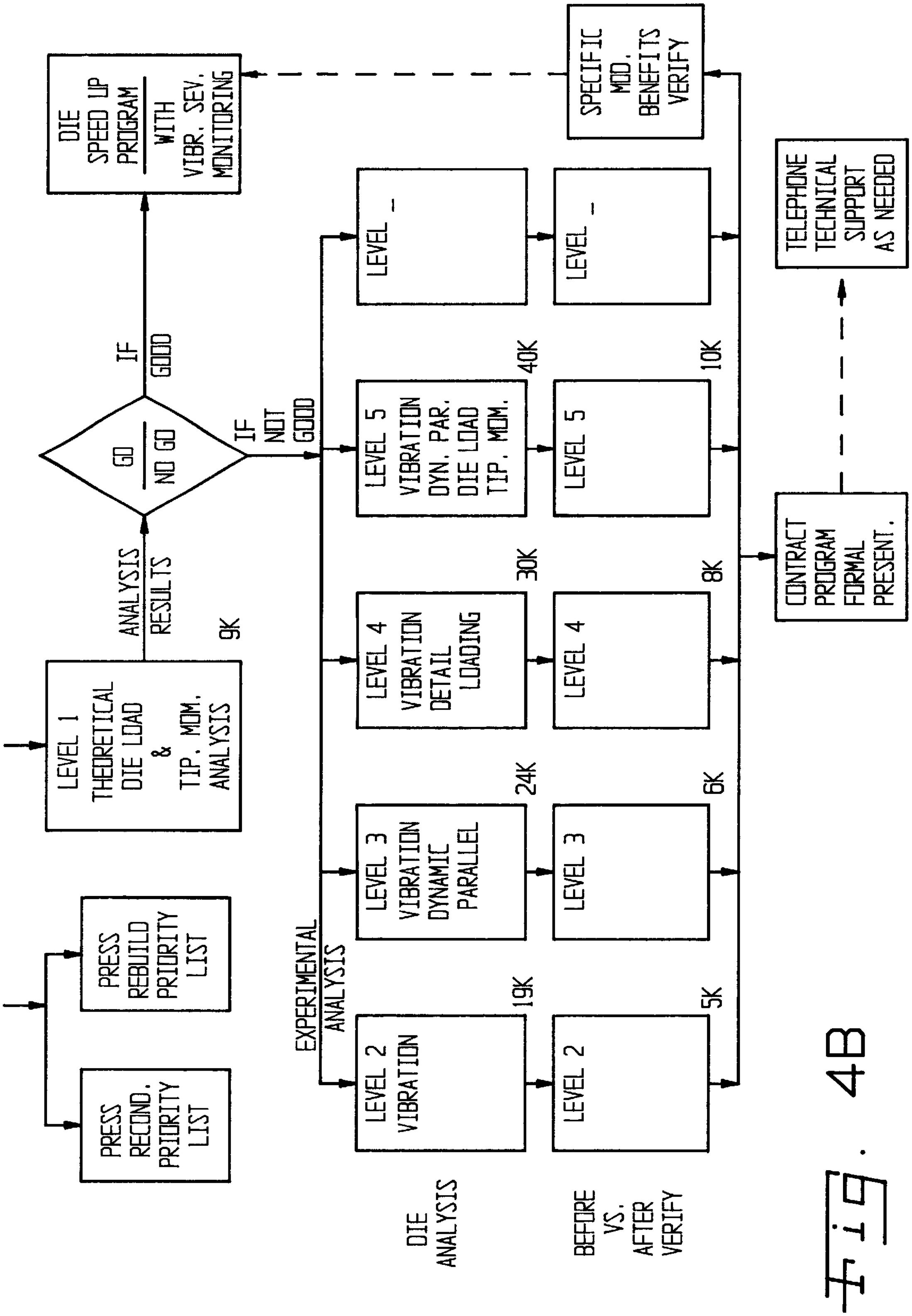
Figure 5:
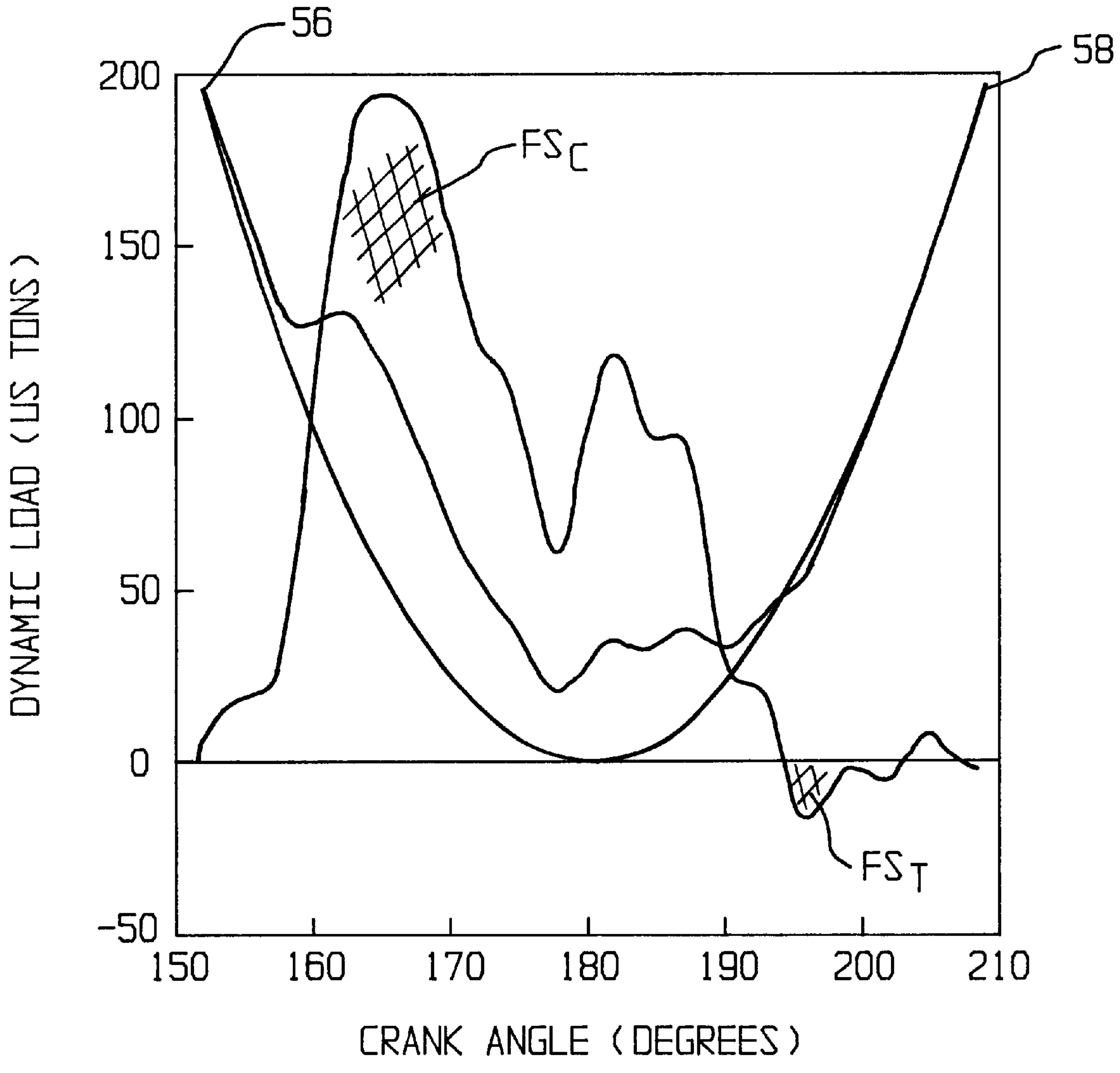
FIG. 5 is a graphical representation of a theoretical no load slide displacement curve superimposed with an actual slide displacement curve and a corresponding force curve representing a graph of the load experienced during a slide stroke of a mechanical press.

Referring now to the drawings and particularly to FIG. 2, there is depicted a typical press 22 having a bed 20 with a bolster 24. Attached vertically to bed 20 are uprights 26 which support a crown 28. Above crown 28 and attached thereto is press motor 34. A slide 30 is operatively connected so that during operation press motor 34 causes slide 30 to reciprocate in rectilinear fashion toward and away from bed 20. Tooling 32 is operatively connected to slide 30. Leg members 50 are formed as an extension of bed 20 and are generally mounted to shop floor 52 by means of shock absorbing pads 54.

Figure 1:
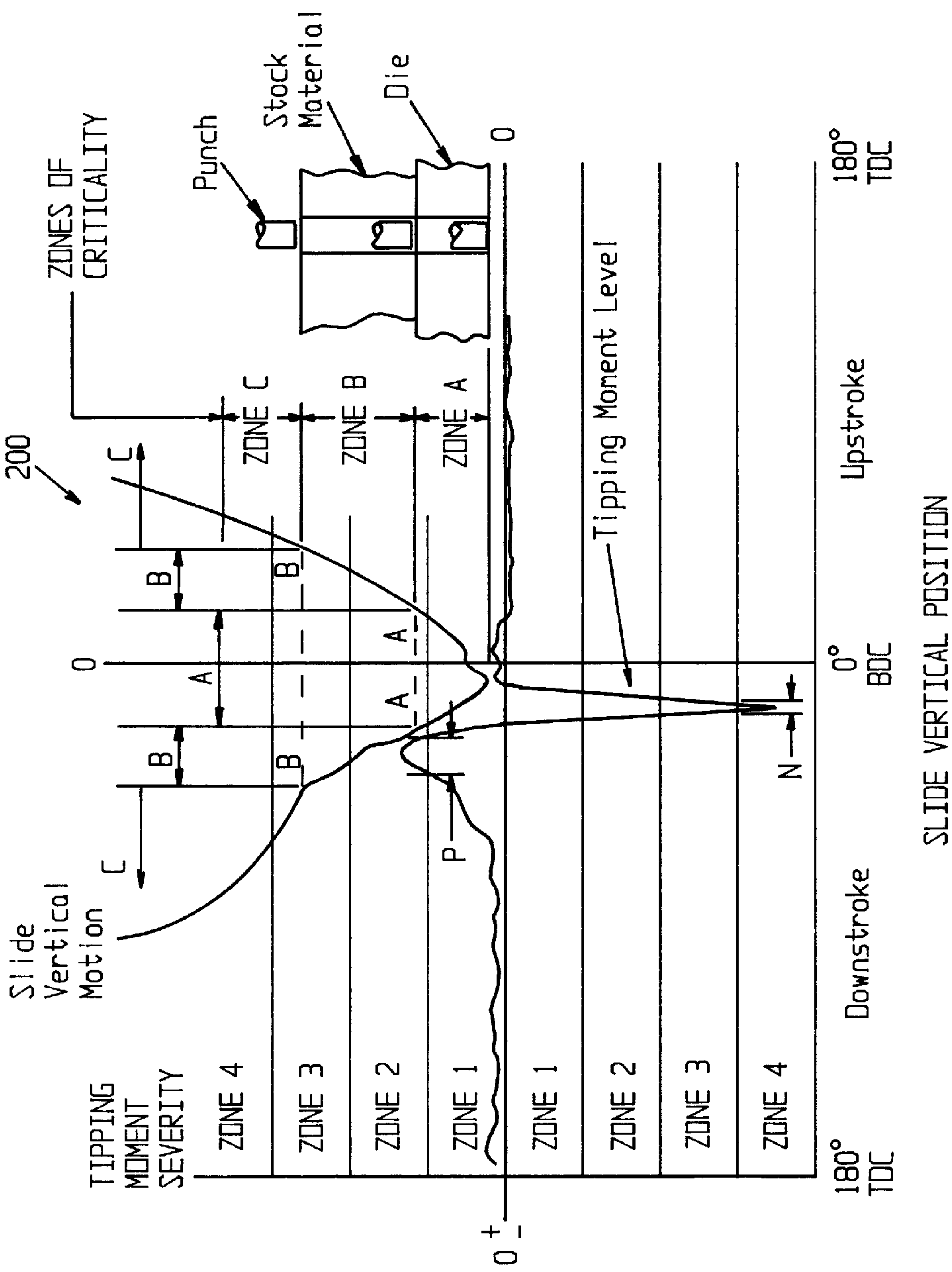
FIG. 1 depicts an empirically generated press tipping moment severity chart according to the present invention.

Referring to FIG. 1, there is shown a tipping moment severity chart 200 generated by the method of the present invention, which is specific to a particular press and die set and which is utilized to determine the operating reliability of the die set. Tipping moment severity chart 200 is a tipping moment severity versus slide vertical position graph. The positive and negative portions of the ordinate of this graph are both divided into four zones of tipping moment severity. Tipping moment severity factors are then associated with these plotted zones of tipping moment severity. The ordinate of tipping moment severity chart 200 is divided into three, four or five zones of criticality which represent free punch travel, punch travel through the stock material and punch travel through the die. A graphical representation of slide vertical motion is plotted on tipping moment severity chart 200. The zones of criticality are projected onto the graphical representation of slide vertical motion so that the zones may then be projected onto the abscissa of tipping moment severity chart 200. Load values are continually monitored and utilized to compute tipping moment values. Tipping moment values are then plotted on tipping moment severity chart 200.

In one preferred embodiment, a measure of die life risk condition is computed by determining the duration of the positive peak tipping moment P (FIG. 1), the duration of the negative peak tipping moment N (FIG. 1) and the tipping moment severity factor and zone of criticality factor which is associated with the positive peak tipping moment and the negative peak tipping moment. The duration of the positive peak tipping moment is multiplied by the appropriate tipping moment severity factor and zone of criticality factor; the duration of the negative tipping moment is multiplied by the appropriate tipping moment severity factor and zone of criticality factor, and these two values are summed to determine a die life risk condition.

Different measures of die life risk condition may be calculated, including the following measures of die life risk condition. Alternate method 1: the positive peak tipping moment severity is multiplied by the duration of the positive peak tipping moment, the appropriate tipping moment severity factor and the appropriate zone of criticality factor; the absolute value of the negative peak tipping moment severity is multiplied by the duration of the negative peak tipping moment, the appropriate tipping moment severity factor and the appropriate zone of criticality factor; and these two values are summed to determine a die life risk condition. Alternate method 2: the tipping moment severity factor associated with the positive peak tipping moment is multiplied by the zone of criticality factor associated with the positive peak tipping moment; the tipping moment severity factor associated with the negative peak tipping moment severity is multiplied by the zone of criticality factor associated with the negative peak tipping moment, and these two values are summed to determine a die life risk condition.

Alternate method 3: monitored tipping moment is associated with the appropriate zone of criticality factor; the absolute value of the monitored tipping moment is then multiplied by the appropriate zone of criticality factor and this value is plotted as a function of slide vertical position, and the area under this curve is computed to determine a value of die life risk condition. Alternate method 4: the monitored tipping moment severity is associated with the appropriate tipping moment severity factor and zone of criticality factor and the absolute value of the monitored tipping moment severity is multiplied by the appropriate tipping moment severity factor and zone of criticality factor. This value is plotted as a function of slide vertical position, the area under this graph is computed and determines a value of die life risk condition. Further measurements may be taken and compared regarding left side versus right side of the presses. Additional measuring of the absolute value between peaks or sides may give an indication of abnormal die settings or press uses. Data may be taken via sensors from press locations including slide, uprights, connection rods, and dies.

In one form of the current invention, theoretical load calculations are performed. A theoretical no load slide displacement curve is continuously computed while an actual slide displacement curve is continuously plotted during a load condition of the mechanical press. The apparatus and method of the current invention then employs a curve matching technique to superimpose these two curves so that values of dynamic deflection at different points in the slide path may be computed. Values of dynamic deflection are then utilized in conjunction with a constant corresponding to the static stiffness of the press to calculate load on the press.

Vibration severity is monitored according to the teachings of U.S. Pat. No. 5,094,107, the disclosure of which is herein explicitly incorporated by reference. Dynamic parallelism as well as other movement and force quantities utilized in the management system of the current invention can be measured by transducers such as strain gauges, as is known in the art. In one preferred embodiment, the mechanical press usage analysis and management system of the current invention includes the following seventeen steps:

Step 1: Check the current operating service condition of the designated service press, via Provider's Service Audit Program, and make press adjustments as necessary. (By Provider, Service at Client Plant Site)

Step 2: Make any repairs, part replacements, or reconditions to the designated press as necessary. (By Provider Service, at client Plant Site)

Step 3: Document the normal operating profiles for each of the press/die applications which are run in the designated press, including Die #, Normal run speed, Parts per week, etc. (By Client) (A reference fill-in chart will be provided by Service Provider)

Step 4: Determine the actual production severity levels for each of the significant press/die applications being run in the designated press. (By Client, with Proprietary Technology Access Contract from Service Provider)

Step 5: Develop from the previous steps, a prioritized listing of the candidate "Key press/die applications", which provide the greatest potential for significant production and reliability benefits of further analyzed in detail. (By Service Provider and Client jointly)

Step 6: Complete the Service Provider provided "Application Description Form for the first of the selected most significant "Key press/die applications", which run in the designated press. (By Client, with guidance provided by Service Provider) (Form will be provided by Service Provider)

Step 7: Compile the relevant die prints and other Service Provider specified die information required for theoretical die load analysis, die tipping severity, and evaluation of other in-die processes, versus distance above BDC. (Forwarded to Service Provider by Client)

Step 8: Complete the Theoretical Die Analysis as described in previous step, and determine the preliminary set of potential production recommendations for press/die adjustments or modifications, using detailed die analysis methodology. (By Service Provider)

Step 9: Complete appropriate level (1, 2 or 3) "Current State" press/die application performance tests, on the first "Key Press/Die" application, in its "as is" condition, to determine the actual details of process severity during actual production operation. (By Service Provider at Plant Site)

Step 10: Complete the results reduction and analysis of the "Current State" Press/Die application test results. (By Service Provider)

Step 11: Verify the die production severity details, and evaluate the experimental results against the theoretical findings, and from this analysis, make appropriate adjustment and/or modification recommendations for die productivity and reliability improvement. (By Service Provider)

Step 12: Complete the Service Provider recommended press/die application set-up adjustments and modification refinements on the specified "Key press/die application", as recommended. Contact Service Provider personnel to coordinate the timing of the refined press/die application production run. (By Client if die refinement, by Service Provider if press refinement)

Step 13: Complete the "Refined State" experimental press/die application performance tests, using experimental die analysis methodologies, after the recommended adjustments and modifications have been incorporated. These tests will further identify if there are any other process severity issues still present which could affect the long term performance reliability of the press/die application. This experimental evaluation also includes identification of the potential to increase the operating production speed of the press/die application. (By Service Provider at Client Plant Site, with Client input and assistance)

Step 14: Complete the results reduction and analysis of "Refined State" press/die application results, to confirm the potential for application speed-up, without any long-term detrimental effects from an material forming or non-material forming in die processes.

Step 15: Ongoing monitoring of the production level of the "Refined State" application using the Vibration Severity Monitoring Technology. The key production severity data should continue to be monitored on a continuing specified production hours timeframe, or on a specified "parts completed" timeframe, to determine if any small production variations, causing increased load or vibration severity, are occurring over time. (By Client production personnel, with initial guidance from Service Provider)

Step 16: Continue to review periodic production severity results against the established baseline criteria, to keep press/die applications under a long term controlled reliability condition. (By Client, with input from Service Provider after review of the faxed data)

Step 17: Monitor the application's long term direct and indirect performance improvements continuing over time. These parameters include the following, and other parameters as jointly identifiable with the client, which also indicates the expected trend in parenthesis ( )

Production speed (increase)
Production output parts (increase)
Parts per die grind (increase)
Material removal per die grind (decrease)
Application Noise level (reduction)
Floor vibration transmission level (decrease)
Die chip frequency, and location (decrease)
Die repair parts cost (decrease)
Die maintenance time and costs (decrease)

Press repair parts costs (decrease)

Press maintenance costs (decrease)

Press uptime availability (increase)

Press utilization rate (increase)

(By Client and Service Provider jointly)

These steps of the current invention are illustrative only and others may be added. These steps may be implemented in differing combinations, including those contained in the following chart:

| Process Step # | Description | A | B | C | D | E | F | G | H | I | J |
|---|---|---|---|---|---|---|---|---|---|---|---|
| 1 | Service Audit and Adjust Press | X | X | X | X | X | X | X | | | |
| 2 | Repair Press as Needed | X | | | | | | | | | |
| 3 | Develop Operating Profile of All Dies Running in Press | X | X | X | | | | | | | |
| 4 | Define Production Severity Level of Dies | X | X | X | | | | | | | |
| 5 | Create Priority List of Die Severity | X | X | X | X | X | | | | | |
| 6 | "Key Die" Application Description Form Completion | X | X | X | | | | | | | |
| 7 | Die Prints Review | X | X | X | X | X | X | | X | | |
| 8 | Complete Theoretical Die Analysis | X | X | X | X | X | X | X | X | X | |
| 9 | Die Prints Review | X | X | X | X | X | X | X | X | X | X |
| 10 | Complete Theoretical Die Analysis | X | | | | | | | | | |
| 11 | Develop Recommendations for Modifications | X | X | X | X | X | X | X | X | | |
| 12 | Complete Application Adjustments/Modifications | X | X | | | | | | | | |
| 13 | Conduct "Refined State" Die Analysis Tests | X | X | X | X | X | X | X | X | X | X |
| 14 | Results Reduction/Analysis | X | | | | | | | | | |
| 15 | Ongoing Production Monitoring Using Vibration Severity Monitor | X | X | X | X | X | X | | | | |
| 16 | Ongoing Production Severity Trends Review | X | X | | | | | | | | |
| 17 | Ongoing Monitoring of Productivity Improvements | X | | | | | | | | | |

wherein A–J represent different embodiments of the press management and analysis system of the current invention.

In one preferred embodiment of the current invention, the mechanical press usage, analysis and management system may be implemented according to the following steps:

Step 1: MANAGEMENT OVERVIEW OF VIBRATION SEVERITY MONITORING TECHNOLOGIES AND METHODOLOGIES—Overview includes management introduction to the technology, as well as discussion of the potential benefits to be realized from a plant wide production monitoring and technology implementation program.

Step 2: PRELIMINARY VIBRATION SEVERITY PLANT SURVEY—Provides an initial snapshot overview of the existing state of capital risk currently within the plant site, with existing die applications running within the existing production presses in their current "as is" state. Program also provides initial hands-on use of the required instrumentation by designated plant personnel.

Step 3: INITIAL VIBRATION SEVERITY MONITORING TECHNOLOGY EVALUATION PROGRAM—Includes 3 month technology license, to provide hands-on use of the handheld, portable instrumentation (including vibration severity) developed to define the overall and ongoing state of capital risk, as created by the majority of all applications running within the existing presses at any production speed.

Step 4: INITIAL PRESS SERVICE AUDIT PROGRAM—Defines the state of maintenance condition of several key presses where the die application risks have been identified as higher than normal, as defined by step 3 activities. Quantity of presses audited can be completed in specified groups of any quantity. The priority for press auditing would also be recommended from the results of step 3.

Step 5: INITIAL PRESS REPAIR/RECONDITION PROGRAM—Upgrades the state of long term readiness of key presses within the plant site facility, on a prioritized bases.

Step 6: INTERMEDIATE PRODUCTION RESULTS PRESENTATION AND REVIEW—Provides an overview of the current state of the plant site facility, regarding both the state of capital risk from existing applications, a well as the state of long term readiness of the presses within the facility. Review of the production severity results to date, provide the necessary data to make informed decisions with regard to proceeding with further technology implementation steps.

Step 7: SEVERE TIPPING MOMENT APPLICATION CONTROL PROGRAM—Identifies an application of severe tipping moment condition which has historically had die life issues, and evaluates the ability to reduce the level of tipping moment to improve both die life and reliability.

Step 8: VIBRATION SEVERITY MONITORING TECHNOLOGY; PRODUCTION IMPLEMENTATION PROGRAM—Implemented the form of a 1 year Plant Site technology licensing program, which includes 24 hr./7 day, unlimited application severity monitoring, for all presses, with any dies, at any speed, with any tooling set-up, and any material, at any time during the licensed timeframe. Additionally, includes a reasonable amount of production level data graphing and interpretation assistance by designated engineers, in order to define the applications of highest priority risk. If desired, a proposal for additional telephone technical assistance per month, can also be included.

Step 9: PRESS AND DIE APPLICATIONS PRIORITIZATION PROGRAM—Correlates all press/die application production severity information, to define the relative level of production risk on each specific press, in order to provide the prioritization plan for capital risk control and long term reliability control, creating improvements to die and press reliability, as well as creating decreases to die and press maintenance and repair expenses.

Step 10: SPECIFIC PRESS/DIE APPLICATION SEVERITY ANALYSIS IMPLEMENTATION PROGRAM—Identifies from the highest priority die risk list, a representative case study die, which is then theoretically and experimentally evaluated to define the current specific process sources of die severity and tipping moment and provides further analysis to reduce the most influencing discrete processes effecting reliability. Recommendations for minor die modification would be the output from this program and could be repeated for several additional dies, with separate proposal provided for each, when desired.

Step 11: SPECIFIC PRESS/DIE APPLICATION IMPROVEMENT VERIFICATION PROGRAM—A follow-up to the previous Step 10 program, to experimentally verify the actual reductions of the specific process sources occurring within the die, and also identifies the ability of the die to be further increased in speed without loss of long term reliability. (Steps 10 and 11 can be repeated for several different dies, with a separate proposal provide for each, when desired.)

Step 12: PRESS AND DIE PERFORMANCE, MAINTENANCE, REPAIR, EXPENSE MONITORING PROGRAM IMPLEMENTATION—Defines the corporate parameters determined to be the most representative for defining the improved state of production and risk control, and to provide insights for the customer to implement an ongoing monitoring program, to capture and track these trends to determine the relative level of improvement of each, and to assess the overall contribution and benefits of the technology implementation program, on the success of the company.

Step 13: ANALYSIS OF FUTURE MONITORING INSTRUMENTATION ALTERNATIVES, FOR ENHANCED PLANT SITE PRODUCTION MANAGEMENT AND CAPITAL RISK CONTROL—Evaluates the potential of additional Vibration Severity technology, production monitoring instrumentation system alternatives, which could provide more advanced plant site production knowledge, and proactive control of production risks on presses.

FIGS. 3a and 3b and 4a and 4b are flow charts illustrating embodiments of the current invention. The mechanical press usage, analysis and management system begins with a management overview of use severity monitoring. The next step is a two day preliminary program that evaluates the vibration severity in a plant survey mode and which looks at the vibration severity conditions of many different press die applications. Additionally, a tipping moment severity plant survey takes place. These two surveys are utilized to create both a worst case vibration severity application list and a worst case tipping moment application list. This information is used in conjunction with customer die chipping information and die repair and maintenance information, and is used to create a list of worst case press die applications which can be utilized to create priorities for getting press applications under control. This information is also utilized to create a list of best case press die combinations which could be utilized as "speed-up" candidates (i.e., could have their production increased). In this way, the best case candidates could be placed into higher productivity while the worst case applications could be identified and these problem applications could be controlled. This information is additionally utilized to identify a press audit priorities list so that machine checks may be regularly performed to verify that the machine is still in manufactured specification and good production-ready condition.

Utilizing the press auditing priorities list, recommendations for recondition, rebuild and/or re-manufacturing priority could be made. Worst case die applications progress into a theoretical die load analysis which is performed according to the steps outlined above. Theoretical die load analysis would be used to identify the die load and tipping moment analysis of the die, and based upon this analysis, a go/no-go decision would be made determining whether the specific monitored press was worthy of being sped up, or whether it required another experimental analysis to determine the extent of the negative processes in the die.

Differing levels of experimental die analysis could then be performed with each level containing different analysis structures. After the experimental analysis has been done in the "as is" state, recommendations would be created to get the application under control. After the recommendations had been implemented, the management and analysis system or procedure would conduct a before versus after test to verify that the press application had improved since implementing the recommendations. The system and procedure is a measurable way to create recursive feedback to enable tracking the improved productivity result created by the methodology. A formal presentation of these results would be made and technical support would be provided as necessary. Vibration severity could be monitored using a hand-held vibration severity monitor as well as utilizing a single vibration severity monitor per press.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of monitoring, analyzing and managing mechanical press usage, comprising the steps of:

monitoring vibration severity, including vibration severity zone;

monitoring tipping moment severity;

monitoring press repair information, including die repair information;

monitoring press maintenance information, including die maintenance information;

monitoring press applied load; and analyzing the effect of vibration severity, tipping moment severity, press repair, press maintenance and applied load to determine necessary press modifications.

2. A mechanical device optimization system, for monitoring a mechanical device within a production facility having a plurality of device applications, said system comprising:

a computation means;

a vibration severity monitoring system generating vibration severity data regarding a least one mechanical device in a production facility and communicating said data to said computation means;

a tipping moment severity monitoring system generating tipping moment data regarding at least one mechanical device in a production facility and communicating said data to said computation means;

the computation means determining which device applications create the worst vibration severity, worst tipping moment severity, and calculating the relative risk of each application.

3. The system of claim 2 in which said devices are mechanical presses.

4. The system of claim 2 in which said applications are die sets for utilization with said devices.

5. The system of claim 2 utilized on at least two devices, said computation means calculating which of said at least two application should operate on which of said at least two devices.

6. The system of claim 5 in which said devices are mechanical presses.

7. The system of claim 5 in which said applications are die sets for utilization with said devices.

8. The system of claim 2 in which said computation means calculates the possible increase in device speed without a decrease in device lifetime or increase in relative risk.

9. The system of claim 8 in which said computation means again operates after the device speed has increased.

10. The system of claim 2 in which said tipping moment severity monitoring system is replaced with a die load monitoring system.

11. The system of claim 2 in which said tipping moment severity monitoring system is replaced with a die chipping monitoring system.

12. The system of claim 2 in which said tipping moment severity monitoring system is replaced with a dynamic parallelism monitoring system.

* * * * *